United States Patent
Peters et al.

(10) Patent No.: US 9,663,144 B2
(45) Date of Patent: May 30, 2017

(54) STEERING KNUCKLE COMPRISING FIBER REINFORCEMENT

(71) Applicants: AKTIEBOLAGET SKF, Göteborg (SE); SEMCON AB, Göteborg (SE)

(72) Inventors: Gilbert Peters, Nijmegen (NL); Richard Schaake, Utrecht (NL); Edo Schramm, The Hague (NL); Cornelius Petrus Antonius Vissers, Den Dungen (NL); Marc Gomez, Ojersjo (SE)

(73) Assignees: AKTIEBOLAGET SKF, Gothenburg (SE); SEMCON AB, Göteborg (SE)

( * ) Notice: Subject to any disclaimer, the term of this patent is extended or adjusted under 35 U.S.C. 154(b) by 0 days.

(21) Appl. No.: 14/895,932

(22) PCT Filed: Jun. 6, 2014

(86) PCT No.: PCT/EP2014/061885
§ 371 (c)(1),
(2) Date: Dec. 4, 2015

(87) PCT Pub. No.: WO2014/195484
PCT Pub. Date: Dec. 11, 2014

(65) Prior Publication Data
US 2016/0121926 A1      May 5, 2016

(30) Foreign Application Priority Data
Jun. 7, 2013   (WO) ................. PCT/EP2013/061790

(51) Int. Cl.
*B62D 7/18* (2006.01)
*B60B 5/02* (2006.01)
(Continued)

(52) U.S. Cl.
CPC ............. *B62D 7/18* (2013.01); *B29C 70/845* (2013.01); *B60B 5/02* (2013.01); *B60B 27/00* (2013.01);
(Continued)

(58) Field of Classification Search
CPC ..... B62D 7/18; B60B 27/0094; B60B 27/065; B60B 27/00; B60B 5/02; B60B 2310/321;
(Continued)

(56) References Cited

U.S. PATENT DOCUMENTS 5,985,072 A * 11/1999 Finck ..................... B29C 63/18
156/169
7,381,445 B2 * 6/2008 Brun ..................... C23C 16/455
427/163.2
(Continued)

FOREIGN PATENT DOCUMENTS

DE       102007053120 A1     5/2009

*Primary Examiner* — Drew Brown
(74) *Attorney, Agent, or Firm* — Bryan Peckjian; SKF USA Inc. Patent Dept.

(57) ABSTRACT

A steering knuckle comprising a bearing connection point for connecting a bearing to the knuckle and comprising a further connection point for connecting the knuckle to a further component. The bearing connection point is formed by a first insert and the further connection point is formed by a second insert, which are joined by a composite body comprising a fiber-reinforced material that is overmolded to the first and second inserts. The bearing connection point and the further connection point are additionally joined by one or more continuous fiber tows that are wound around part of a radially outer surface of the first insert and of the second insert.

13 Claims, 4 Drawing Sheets

(51) Int. Cl.
*B60B 27/00* (2006.01)
*B60B 27/06* (2006.01)
*B29C 70/84* (2006.01)
B29K 263/00 (2006.01)
B29K 307/04 (2006.01)

(52) U.S. Cl.
CPC ........ *B60B 27/0094* (2013.01); *B60B 27/065* (2013.01); *B29K 2263/00* (2013.01); *B29K 2307/04* (2013.01); *B60B 2310/321* (2013.01); *B60B 2900/111* (2013.01); *B60G 2206/50* (2013.01); *B60G 2206/71* (2013.01)

(58) Field of Classification Search
CPC ............ B60B 2900/111; B29C 70/845; B29K 2307/04; B29K 2263/00; B60G 2206/71; B60G 2206/50
See application file for complete search history.

(56) References Cited

U.S. PATENT DOCUMENTS

| | | | | |
|---|---|---|---|---|
| 8,042,766 | B2* | 10/2011 | Steinke | B29C 70/86 244/103 R |
| 8,297,632 | B2* | 10/2012 | Webster | B22D 18/04 280/93.512 |
| 8,910,759 | B2* | 12/2014 | Marquar | B60G 15/07 188/251 A |
| 2006/0024490 | A1* | 2/2006 | Werner | B22D 19/14 428/323 |
| 2006/0054423 | A1* | 3/2006 | Murata | F16D 55/22 188/18 A |
| 2010/0001130 | A1 | 1/2010 | Steinke et al. | |
| 2011/0056785 | A1 | 3/2011 | Marquar et al. | |
| 2012/0049477 | A1 | 3/2012 | Webster et al. | |

* cited by examiner

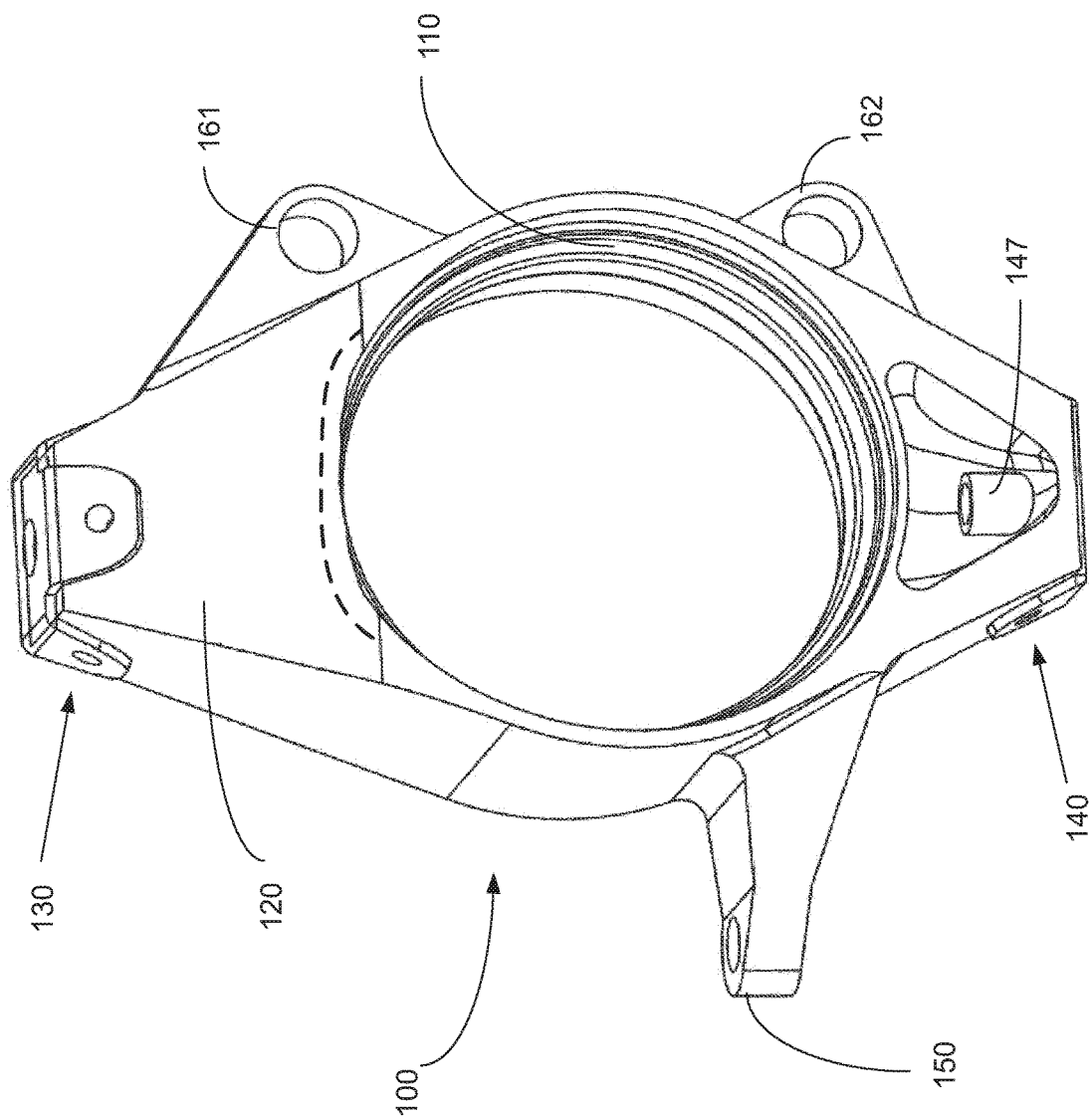

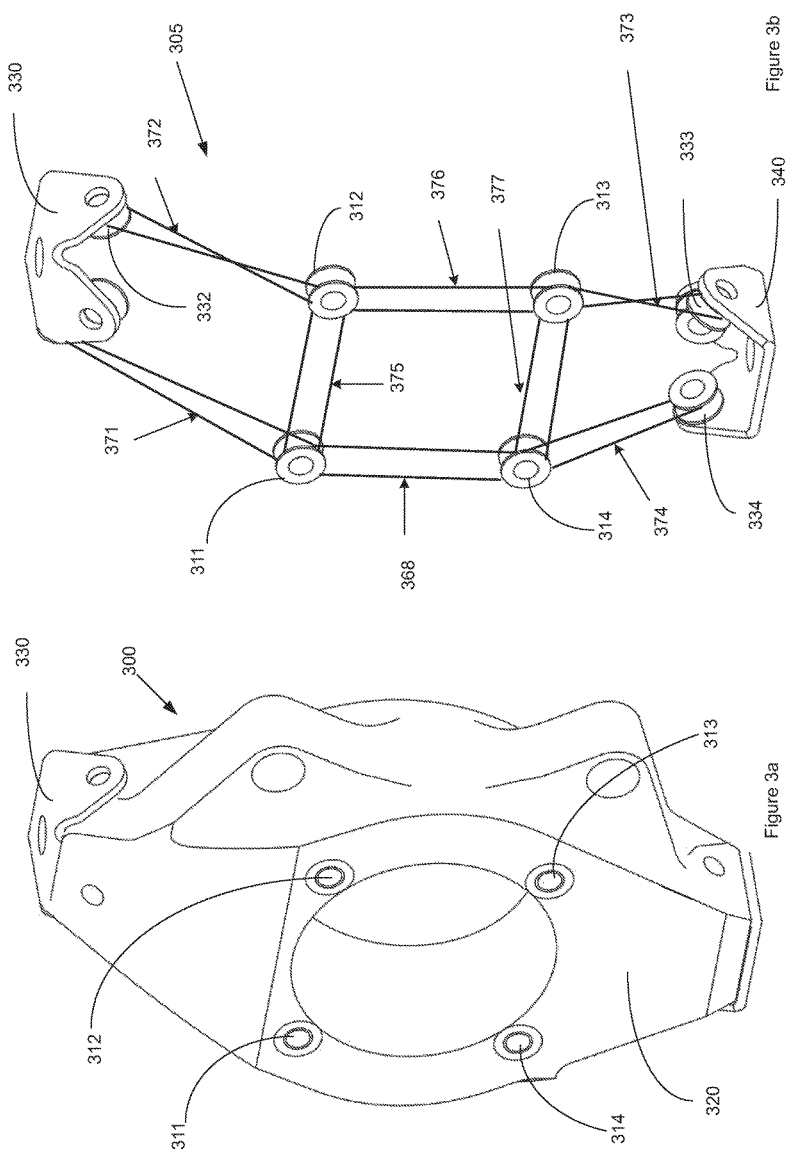

STEERING KNUCKLE COMPRISING FIBER REINFORCEMENT

CROSS REFERENCE TO RELATED APPLICATIONS

This is a United States National Stage Application claiming the benefit of International Application Number PCT/EP2014/061885 filed on 6 Jun. 2014, which claims the benefit of Europe (EP) Patent Application PCT/EP2013/061790 filed on 7 Jun. 2013, both of which are incorporated herein by reference in their entireties.

FIELD OF THE INVENTION

The present invention relates to a steering knuckle that is at least partly made from a fiber-reinforced composite material.

BACKGROUND TO THE INVENTION

In the interests of fuel economy, there is an increasing drive within the automotive industry towards weight reduction of the component parts of vehicles. One such component is the steering knuckle, which connects the wheel bearing to the vehicle suspension. Typically, steering knuckles are made of cast iron and consequently, there is potential for weight savings by manufacturing the knuckle from a lightweight material such as fiber-reinforced polymer.

An example of such a steering knuckle is disclosed in DE102007053120 A1. The steering knuckle is formed from a laminar textile comprising fibers bound in a matrix. A weight reduction is achieved, but the knuckle must also possess sufficient strength and stiffness to withstand the application loads. In use, the wheel bearing can experience high forces, which are transmitted to the vehicle suspension through the knuckle.

There is still room for improvement.

SUMMARY OF THE INVENTION

The present invention resides in a steering knuckle as specified in claim 1, whereby the dependent claims describe advantageous embodiments and further developments of the invention.

Specifically the invention resides in a steering knuckle comprising a bearing connection point for connecting a wheel bearing to the knuckle and comprising a further connection point for connecting the knuckle to a further component. The bearing connection point is formed by a first insert and the further connection point is formed by a second insert, which are joined via a composite body comprising a fiber-reinforced material that is overmolded to the first and second inserts. To increase strength and stiffness, the bearing connection point and the further connection point are additionally joined by one or more continuous fiber tows that are wound around part of an outer surface of the first insert and of the second insert.

The forces acting on the composite knuckle are introduced via the connection points. A force acting on one connection point results in a reaction force on the other connection point. The resulting load path runs between the connection points, meaning that a knuckle according to the invention comprises fiber-reinforcement located at, and in alignment with, the load path. As a result, the composite knuckle has improved strength and stiffness where it is needed most.

In one embodiment the first insert is formed by sleeve element which has a bore for receiving the bearing. The sleeve element can be e.g. a steel part to which an outer ring of the bearing is connected. Alternatively, the sleeve element may serve as the bearing outer ring. Preferably, the sleeve element is then made of a bearing grade steel, whereby at least a radially inner surface of the sleeve element has a hardened portion for forming a raceway for at least one row of rolling elements. A sleeve element that serves as the bearing outer ring may also be made from a suitable ceramic material or from titanium.

In a further embodiment the first insert comprises a plurality of bolt inserts, to enable a flanged bearing ring to be bolted to the composite knuckle. Typically, a flanged bearing ring has four or five bolt holes and the composite knuckle has an equal number of bolt inserts. Suitably, the bolt inserts are made of a metal such as steel and have a tubular geometry provided with an internal thread.

In one example of the further embodiment, at least one of the bolt inserts is joined to the second insert of the further connection point by a continuous fiber tow that is looped around the outer surface of the bolt insert and of the second insert. Preferably, each bolt insert is joined to the first insert in this way.

In a second example of the further embodiment, the first insert comprises a plurality of bolt-inserts which are joined by a connection element. The connection element may be a ring or have another suitable geometry with a smoothly curved outer surface. The connection element may then be joined to the second insert by looping the continuous fiber tow around part of the outer surface of the connection element and of the second insert.

The second insert in a knuckle according to the invention is suitably formed by one of an upper and a lower connection point for a ball joint, which respectively connects an upper and a lower control arm of the vehicle suspension. In a preferred example, the second insert is a bracket, which has a tubular portion for receiving a stem of the ball joint. The bracket further comprises one or more stubs, arranged around the tubular portion. Preferably, each stub portion of the bracket is joined to the first insert by means of a separate continuous fiber tow. The stubs may have a cylindrical outer surface or other suitable shape, such that the continuous fiber tow is wound around part of the outer surface which has a smooth, curved surface. In a further example, the second insert comprises stub portions which are adapted for the connection of a separate ball joint bracket.

Suitably, both of the upper and lower connection points for the upper and lower control arms respectively are joined to the first insert by means of a continuous fiber tow.

A steering knuckle typically comprises other connection points for e.g. a steering arm and for mounting a brake calliper device to the knuckle. In a further example of a knuckle according to the invention, one or more of the other connection points are formed by a third insert that is connected to one of the first and second inserts via a continuous fiber tow that is wound around part of the outer surface of the inserts.

As mentioned, the continuous fiber tows in a knuckle according to the invention are located within the composite body in the load path between connection points. The load path is an ideal site for measuring application loads. Thus in a further development of the invention, at least one of the continuous fiber tows that join the first and second inserts comprises a sensing fiber. An optical fiber comprising one or more fiber Bragg gratings is one example of a suitable sensing fiber. The sensing fiber may also be a piezoelectric fiber. Thus, the loads that act on the bearing, and which are transferred to the further component through the composite body of the knuckle, can be accurately measured.

The fiber-reinforced material that forms the composite body in a knuckle according to the invention is preferably a long fiber molding compound comprising fibers with a length of 5-50 mm, embedded in a polymer matrix. Suitable materials for the fibers include glass, carbon, aramid, PBO (polybenzoxazole) and HDPE (high-density polyethelene). Suitable matrix materials include expoxy resin, phenolic resin, bismaleimide resin and polyimide resin.

The continuous fiber tows which connect the bearing connection point with the one or more further connection points may also be made from carbon, glass, aramid, HBO or HDPE fibers. Advantageously, different types of fiber are selected, depending on the properties requires. For example, an aramid fiber such as Kevlar® may be selected to provide energy absorption and safety in response to impact loads. A high-modulus carbon fiber may be selected to enhance stiffness. Alternatively or additionally, a high-strength carbon fiber may be selected to increase strength and load-carrying capacity.

As will be understood, the type of fiber, the number of fibers in the continuous fiber tow and the number of loops around the bearing connection point and the further connection point are selected depending on the application loads in question.

The present invention further defines a method of manufacturing a steering knuckle comprising a bearing connection point for connecting a wheel bearing to the steering knuckle and comprising a further connection point for connecting the steering knuckle to a further component, wherein:
  the bearing connection point is formed by a first insert;
  the further connection point is formed by a second insert; and
  the first and second inserts are joined by a composite body made of a fiber-reinforced matrix material.
The method comprised steps of:
  i. winding a continuous fiber tow around part of an outer surface of the first insert and around part of an outer surface of the second insert, thereby creating a pre-form in which the first and second inserts are connected via one or more loops of the continuous fiber tow; and
  ii. overmolding the fiber-reinforced matrix material to the pre-form.

The continuous fiber tows provide strength and stiffness in tension. Advantageously, the fibers are pre-tensioned during the winding process, to obtain optimal performance from the fiber properties. Thus, in a further development, the outer surface of at least one of the first and second inserts is provided with retaining means, and the step of winding comprises using the retaining means to pretension the continuous fiber tow.

In one example, the first and/or second insert has grooves in the outer surface with a depth and width that is essentially equal to the diameter of the fiber tow. Typically, the fiber tow has a diameter of 0.5-1.5 mm. Preferably, each insert is provided with grooves. During the winding process, the fiber tow is wound around the grooves, which helps to keep the fiber tow in place, thereby facilitating pre-tensioning. In a further example, the outer surface of the first and/or second insert is provided with pegs that protrude from the outer surface, for guiding and retaining the fiber tows.

After the winding process, the pre-form is placed in a mould. Advantageously, the first and second inserts are used in the step of overmolding to support and precisely locate the preform with the mould. This also helps to ensure that fiber pretension is maintained.

Other advantageous of the present invention will become apparent from the details description and accompanying drawings.

BRIEF DESCRIPTION OF THE DRAWINGS

The invention will now be described further, with reference to the following Figures, in which:

FIG. 1a shows a perspective view of a first embodiment of a steering knuckle according to the invention;

FIG. 1c shows a perspective view of a bracket used in the steering knuckle of FIG. 1a;

FIG. 3a shows a second embodiment of a steering knuckle according to the invention; and FIG. 3b shows a front view of a pre-form of the steering knuckle of FIG. 3a, prior to molding.

DETAILED DESCRIPTION OF THE PRESENT INVENTION

Figure 1B:
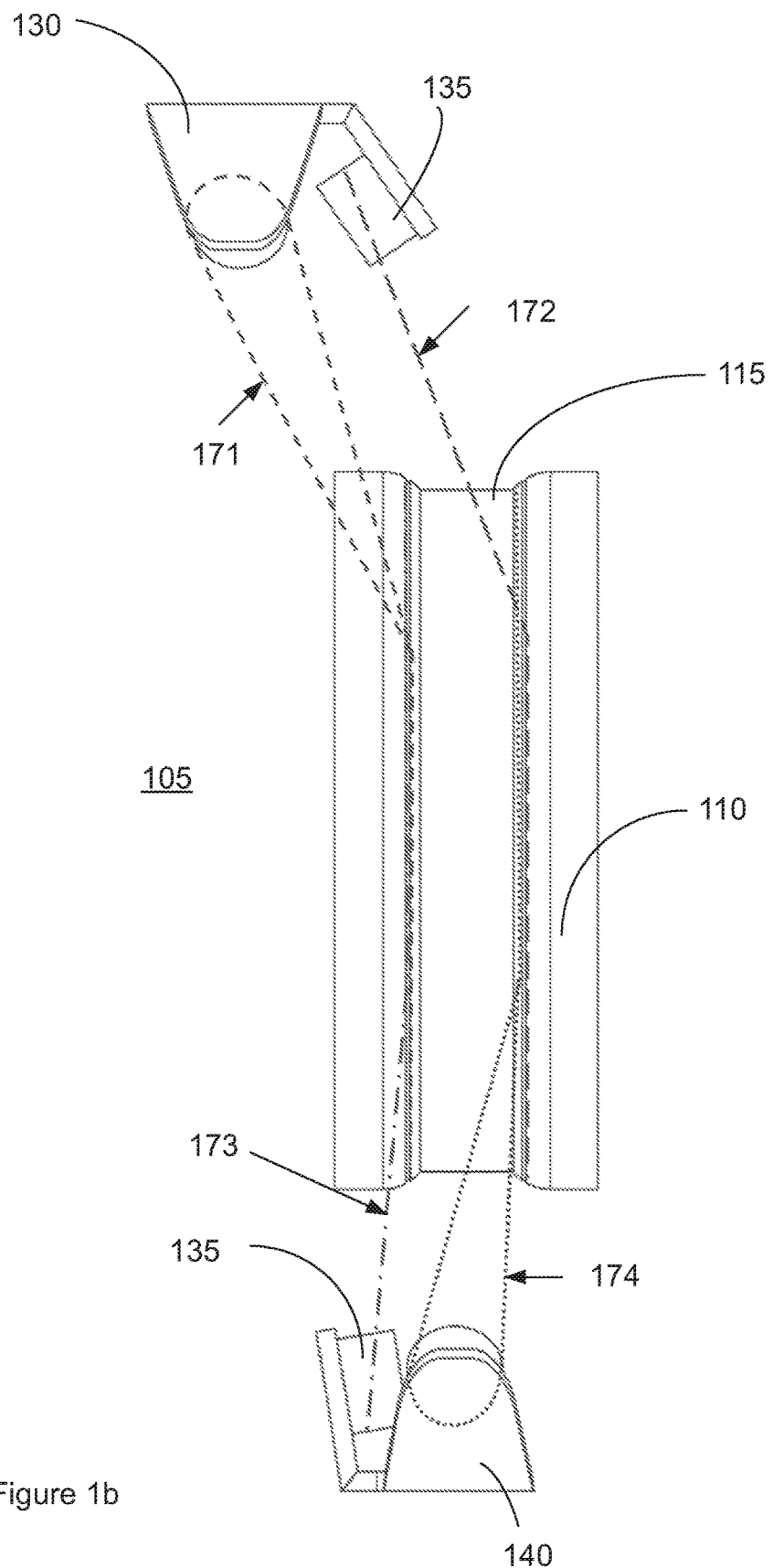
FIG. 1b shows a side view of a pre-form of the steering knuckle of FIG. 1a, prior to molding.

An example of a first embodiment of a steering knuckle according to the invention is shown in FIG. 1a. The knuckle 100 comprises a bore for receiving a wheel bearing unit. The bore is formed in a sleeve element 110, to which an outer ring of the bearing unit may be mounted. In the depicted example, the sleeve element serves as the bearing outer ring and is made of a bearing-grade steel, whereby at least an inner circumference of the outer ring 110 comprises hardened portions to act as a raceway for a first row and a second row of rolling elements of the bearing unit.

The knuckle further comprises a composite body 120 that is made of a long fiber molding compound comprising e.g. carbon fibers in an epoxy resin matrix. In addition to the bore for connection of the bearing unit, the knuckle 100 comprises a number of further connection points. In use, the knuckle is mounted to a vehicle suspension via an upper control arm, a lower control arm and a steering arm. The upper and lower control arms are connected via a ball joint, and the knuckle 100 comprises a corresponding upper connection point 130 and a lower connection point 140 in the form of a bracket comprising a tubular portion 147 for receiving a stem of the ball joint. The steering arm is connected to the knuckle 100 at an intermediate connection point 150. At an opposite side from the connection point 150, the knuckle further comprises first and second connection points 161, 162 for attaching a brake caliper device to the knuckle.

In use, a variety of forces act on the knuckle. The largest forces are the wheel forces, which are transferred to the knuckle through the bearing unit. These forces are transferred to the vehicle suspension mainly through the upper and lower connection points 130, 140, via the knuckle body 120. As mentioned, the knuckle body is made from a long-fiber molding compound. This material may not provide the knuckle with sufficient strength and stiffness to withstand the application forces.

According to the invention, the knuckle 100 further comprises continuous fiber tows which are wound around the bearing outer ring 110 and the upper and lower connection points 130, 140. The fiber tows are thus concentrated at, and are in alignment with, a load path that runs through the knuckle body 120 from the bearing connection point (i.e. the outer ring 110) to the upper and lower suspension connections points 130, 140. The optimal alignment and location of the fibers results in optimal strength and stiffness of the knuckle 100.

Figure 1C:
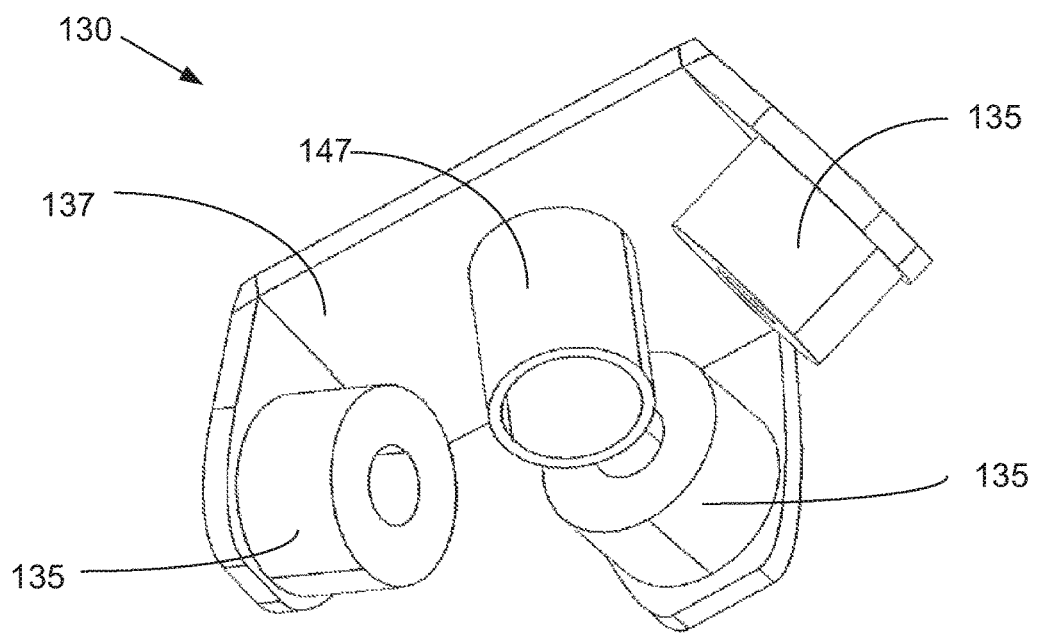

The winding of the continuous fiber tows takes place prior to molding of the knuckle body 120. A pre-form is thus produced, which is then overmolded with the long-fiber molding compound. FIG. 1b shows a side view of an example of the pre-form, during the winding process The bearing outer ring 110 is fixed on a rig (not shown). The upper bracket 130 and the lower bracket 140 are likewise fixed to the rig, at locations relative to the bearing outer ring 120 suitable for connection of the upper and lower control arm ball joints. A perspective view of the upper bracket 130 is shown in FIG. 1c.

As mentioned, the upper bracket and the lower bracket comprise a tubular part 147 for receiving the stem of a ball joint. This part 147 may be threaded, may have a tapered bore, or may have a straight bore such that the ball joint stem can be bolted to the bracket 130, 140. A center axis of the tubular part is perpendicular to or translationally perpendicular to a rotation axis of the bearing. To facilitate the connection of the bearing outer ring 110 with the upper and lower brackets via continuous fibers, each bracket 130, 140 further comprises stub portions 135 around which a continuous fiber tow may be wound. The stub portions 135 also facilitate the connection of the brackets 130, 140 to the overmolded composite body 120, and provide locking in a radial direction. In the depicted example, each of the upper and lower brackets has three stub portions 135 with a cylindrical outer surface, which are arranged around the tubular portion 147. A radially outer part of the cylindrical surface, relative to the location of the bearing ring 110, forms the surface around which the continuous fiber tow is looped.

The tubular portion 147 and the stub portions 135 are joined by a connecting portion 137, such that the bracket forms a single piece. This facilitates the positioning of the bracket on the winding rig.

The pre-form is made using e.g. an automated fiber placement machine or robot. In FIG. 1b, four continuous fiber tows are depicted. A first tow 171 is wound around part of an outer circumference of a first stub portion of the upper bracket 130 and then around part of an outer circumference of the bearing outer ring 110. A second tow 172 is wound around part of the outer circumference of a second stub portion 135 of the upper bracket and then around part of the bearing outer ring outer circumference. A third stub portion of the upper bracket 130 is connected in a similar fashion to the bearing outer ring via a further continuous fiber tow (not shown). For connecting the bearing outer ring and the lower bracket, a third tow 173 is wound around part of the outer circumference of a first stub portion 135 of the lower bracket 140 and then around part of the outer circumference of the bearing outer ring 110. A fourth tow 174 is wound around part of the outer circumference a second stub portion of the lower bracket 140. A further tow (not shown) connects the third stub of the lower bracket and the bearing ring in a similar fashion. Suitably, each fiber tow is looped a number of times around the bearing outer ring 110 and a stub 135, depending on the magnitude of the loads acting on the connection points. The thickness of the fiber tow may also vary depending on the loads. Furthermore, fiber tows made from different fiber materials may be used to impart different advantageous properties to the knuckle 100.

In a steering knuckle according to the invention, the bearing connection point 110 and the upper and lower suspension connection points 130, 140 serve as placeholders for the continuous fiber tows 171, 172, 173, 174 during the winding process. Advantageously, the fiber tows are pretensioned during the winding process. To assist fiber-pretensioning and to help guide and retain the fiber tows, the outer circumference of the bearing outer ring 110 and of the stub portions 135 on the upper and lower brackets are preferably provided with retention means. In the example of FIG. 1b, grooves with a depth and width essentially equal to the diameter of the fiber tows are provided in the outer surface of the bearing outer ring 110 and in the outer surface of the stub portions 135. The fiber tows are then provided in these grooves during the winding process.

Figure 2:
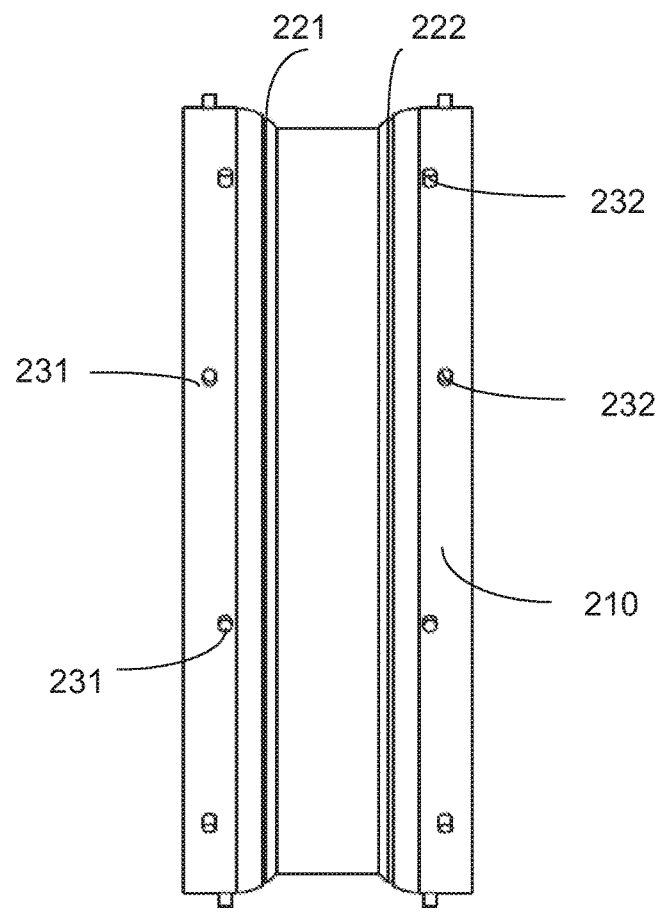
FIG. 2 shows an example of a bearing outer ring that may be connected to a further component in a steering knuckle according to the first embodiment.

An alternative solution for guiding and retaining the fiber tows is depicted in FIG. 2, which shows a side view of a bearing outer ring suitable for use in a knuckle according to the first embodiment of the invention. The outer circumference of the bearing outer ring 210 is provided with a first row of pegs 231 and a second row of pegs 232, which are axially spaced from the first row. The pegs 231, 232 protrude from the outer surface of the bearing outer ring and are circumferentially spaced. Adjacent pegs in a row may also have a slight axial offset relative to each other. During the winding process, one fiber tow is wound around the bearing outer ring, such that the fiber tow slaloms in and out of the first row of pegs 231. A further fiber tow is wound around the second row of pegs 232 in a similar fashion. In addition, the outer circumference of the bearing ring 201 is provided with first and second grooves 221, 222 for receiving a continuous fiber tow. The grooves are located in the region of the bearing raceways, which is the location where the loads on the rolling elements of the bearing are transmitted to the outer ring. The loads are thus led directly to the upper and lower suspension connection points via the continuous fiber tows.

In the depicted examples, the continuous fiber tows comprise dry carbon fibers. These fibers will become impregnated with matrix material that is absorbed from the long-fiber molding compound, when the knuckle body 120 is overmolded. It is also possible to use pre-impregnated fibers, which may be cured prior to placing the preform in the mould or which may be cured simultaneously with the molding compound.

When the pre-form is finished, it is placed in a mold and overmolded with long-fiber molding compound. Suitably, the bearing outer ring 110, the upper bracket 130 and the lower bracket 140 are precisely located and fixed to the mould during the molding process. This helps to maintain the pretension in the fiber tows, which was achieved during the winding process. Maintaining fiber pretension is advantageous in terms of optimizing the fiber properties and thus the performance of the finished component.

As may be seen in FIG. 1b, the bearing outer ring 110 also has a central annular groove or recessed portion 115. During the overmolding process, the molding compound flows into the recessed portion, which mechanically locks the bearing ring 110 to the composite body 120 in an axial direction.

After molding and curing, the knuckle body may be machined. In the example shown in FIG. 1a, the connection points 161, 162 for the brake caliper and the intermediate connection point 150 for the steering arm are mounting holes machined into the knuckle body 120. As will be understood, these connection points may also be formed by inserts that are connected to the bearing outer ring and/or to the upper and lower brackets 130, 140 by continuous fiber tows.

An example of a second embodiment of a steering knuckle 300 according to the invention is depicted in FIG. 3a. The associated pre-form 305 is shown in FIG. 3b.

In the second embodiment, the bearing connection point is formed by first, second, third and fourth bolt inserts 311, 312, 313, 314 for enabling a wheel bearing unit with a flanged outer ring to be bolted to the knuckle 300. The knuckle further comprises an upper bracket 330 and a lower bracket 340, for connection of the upper and lower control arms respectively. The upper and lower brackets 330, 340 are joined to the bolt inserts 311, 312, 313, 314 by an overmolded composite body 320. Again, long-fiber molding compound is used in the depicted example to form the composite body.

In accordance with the invention, each bolt insert is additionally joined to one of the upper and lower brackets by a continuous fiber tow that is looped around the threaded insert and around a stub portion of the bracket.

With reference to FIG. 3b, a first continuous fiber tow 371 is looped around part of an outer circumference of the first bolt insert 311 and around part of an outer circumference of a first stub portion (not visible) on the upper bracket 330. A second continuous fiber tow 372 is looped around part of an outer circumference of the second bolt insert 312 and around part of an outer circumference of a second stub portion 332 on the upper bracket 330. A third continuous fiber tow 373 is looped around part of an outer circumference of the third bolt insert 313 and around part of an outer circumference of a third stub portion 333 on the lower bracket 340. A fourth continuous fiber tow 374 is looped around part of an outer circumference of the fourth bolt insert 314 and around part of an outer circumference of a fourth stub portion 334 on the lower bracket 340.

The steering knuckle 300 is provided with further strength and stiffness in that adjacent bolt inserts are joined to each other by a continuous fiber tow. A fifth continuous fiber tow 375 is looped around part of the outer circumference of the first and second bolt inserts 311, 312. A sixth continuous fiber tow 376 is looped around part of the outer circumference of the second and third bolt inserts 312, 313. A seventh continuous fiber tow 377 is looped around part of the outer circumference of the third and fourth bolt inserts 313, 314. Finally, an eighth continuous fiber tow 378 is looped around part of the outer circumference of the first and fourth bolt inserts 311, 314.

Thus, a steering knuckle according to the invention is a lightweight component that also delivers the robustness required in wheel end applications.

A number of aspects/embodiments of the invention have been described. It is to be understood that each aspect/embodiment may be combined with any other aspect/embodiment. Moreover the invention is not restricted to the described embodiments, but may be varied within the scope of the accompanying patent claims.

The invention claimed is:

1. A steering knuckle comprising:
a bearing connection point for connecting a wheel bearing to the steering knuckle; and
a further connection point for connecting the steering knuckle to a further component,
wherein the bearing connection point is formed by a first insert,
wherein the further connection point is formed by a second insert,
wherein the bearing connection point and the further connection point are joined via a composite body comprising a fiber-reinforced material that is overmolded to the first and second inserts,
wherein the bearing connection point and the further connection point are additionally joined by a continuous fiber tow that is wound around part of a radially outer surface of the first and second inserts,
wherein the second insert comprises at least two stub portions, and wherein the continuous fiber tow is wound around part of an outer surface of each of the at least two stub portions and of the radially outer surface of the first insert.

2. The steering knuckle according to claim 1, the first insert further comprising a sleeve element,
wherein a bore of the sleeve element is one of:
(a) adapted to receive an outer ring of the wheel bearing, or
(b) adapted to serve as an outer raceway of the wheel bearing.

3. The steering knuckle according to claim 1, wherein the first insert comprises at least one bolt insert, to enable a flanged wheel bearing to be bolted to the steering knuckle, and
wherein the continuous fiber tow is wound around part of an outer surface of the at least one bolt insert.

4. The steering knuckle according to claim 3,
the first insert further comprising at least two bolt inserts,
wherein the at least two bolt inserts are joined to each other by a second continuous fiber tow that is looped around respective outer surfaces of the at least two bolt inserts.

5. The steering knuckle according to claim 1, the first insert further comprising at least two bolt inserts,
the steering knuckle further comprising a connection member that interconnects the at least two bolt inserts,
wherein the continuous fiber tow is wound around part of a radially outer surface of the connection member.

6. The steering knuckle according to claim 1, wherein the radially outer surface of at least one of the first insert and the second insert is provided with a retaining feature for guiding and retaining the continuous fiber tow.

7. The steering knuckle according to claim 6, wherein the retaining feature is formed by at least one groove having a depth and width essentially equal to a diameter of the continuous fiber tow.

8. The steering knuckle according to claim 6, wherein the retaining feature is formed by at least one peg which protrudes from the radially outer surface of the at least one of the first insert and the second insert.

9. The steering knuckle according to claim 1, wherein the composite body is made from a long fiber moulding compound.

10. The steering knuckle according to claim 1, wherein at least one of the first insert and the second insert comprises a recessed portion into which the overmolded composite material flows, for mechanically locking of the at least one of the first insert and the second insert to the composite body.

11. A steering knuckle comprising:
a bearing connection point for connecting a wheel bearing to the steering knuckle; and
a further connection point for connecting the steering knuckle to a further component,
wherein the bearing connection point is formed by a first insert,
wherein the further connection point is formed by a second insert, wherein the bearing connection point and the further connection point are joined via a composite body comprising a fiber-reinforced material that is overmolded to the first and second inserts, wherein the bearing connection point and the further connection point are additionally joined by a continuous fiber tow that is wound around part of a radially outer surface of the first and second inserts, wherein the second insert is one of:
- (a) formed by an upper connection point for receiving a ball joint for connecting the steering knuckle to an upper control arm, or
- (b) formed by a lower connection point for receiving a ball joint for connecting the steering knuckle to a lower control arm.

12. The steering knuckle according to claim 11, the second insert further comprising a tubular portion for receiving a stem of the ball joint, and forms a bracket for the ball joint.

13. A steering knuckle comprising:

a bearing connection point for connecting a wheel bearing to the steering knuckle; and a first further connection point for connecting the steering knuckle to a further component, wherein the bearing connection point is formed by a first insert, wherein the first further connection point is formed by a second insert, wherein the bearing connection point and the first further connection point are joined via a composite body comprising a fiber-reinforced material that is overmolded to the first and second inserts, wherein the bearing connection point and the first further connection point are additionally joined by a first continuous fiber tow that is wound around part of a radially outer surface of the first and second inserts, the steering knuckle further comprising a second further connection point formed by a third insert, for enabling the connection of at least one of a steering arm and a brake calliper device, wherein the third insert is connected to at least one of the first insert and the second insert by a second continuous fiber tow.

* * * * *